J. H. NICHOLES.
PLOW.
APPLICATION FILED AUG. 24, 1909.
949,492.
Patented Feb. 15, 1910.
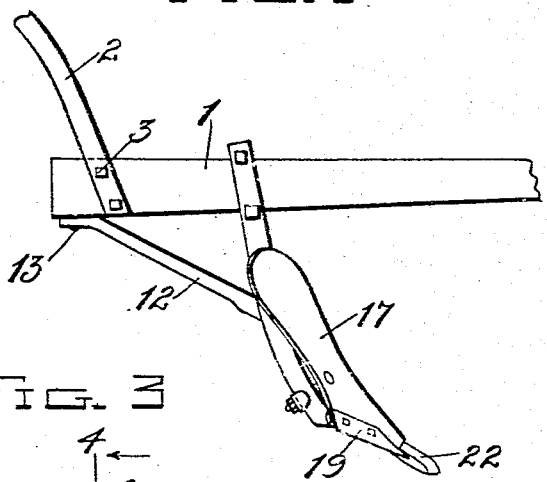
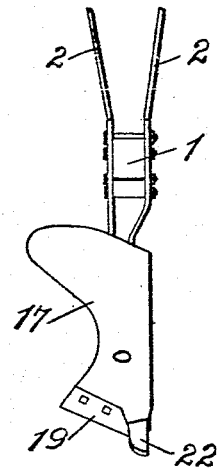
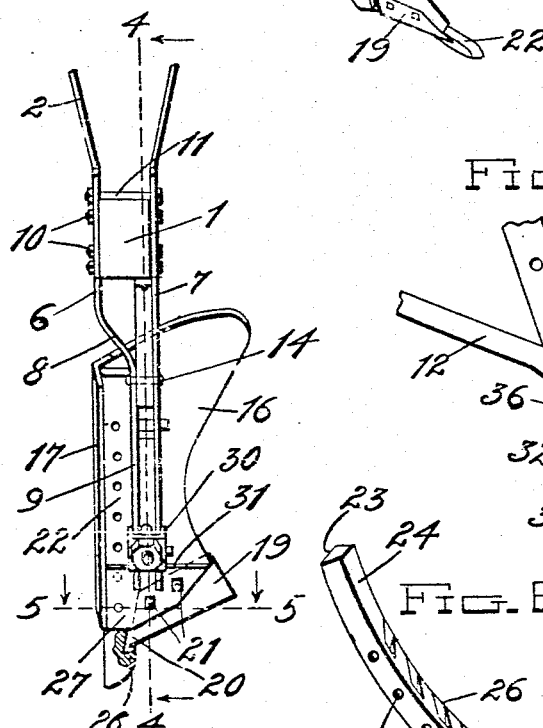
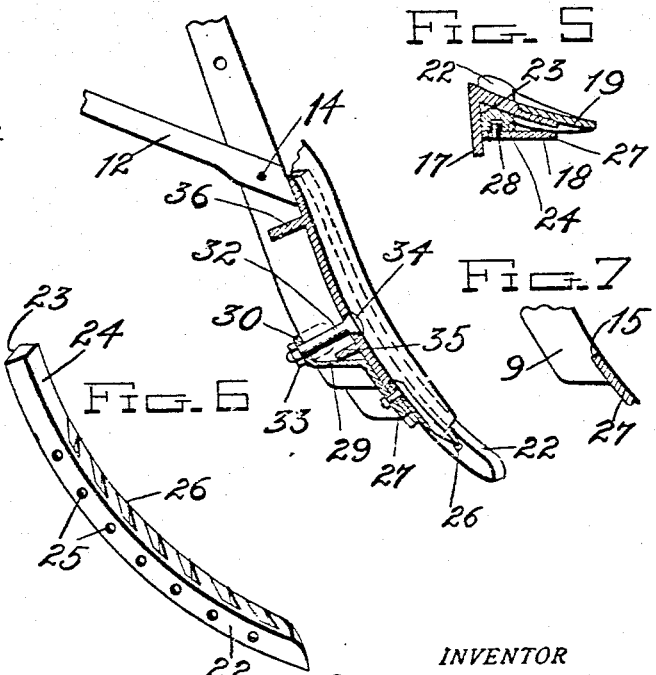
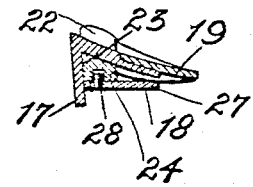
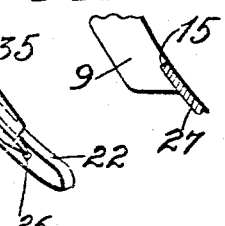
WITNESSES
Wm. C. Powers
N. Lou Bogen
INVENTOR
J. H. Nicholes
By H. C. Evert & Co. Attorneys

UNITED STATES PATENT OFFICE.

JOHN H. NICHOLES, OF WEDGEFIELD, SOUTH CAROLINA.

PLOW.

949,492.

Specification of Letters Patent.  Patented Feb. 15, 1910.

Application filed August 24, 1909.  Serial No. 514,372.

*To all whom it may concern:*

Be it known that I, JOHN H. NICHOLES, a citizen of the United States of America, residing at Wedgefield, in the county of Sumter and State of South Carolina, have invented certain new and useful Improvements in Plows, of which the following is a specification, reference being had therein to the accompanying drawing.

This invention relates to plows and the object thereof is to provide a plow in the manner as hereinafter set forth comprising an adjustable plow point-forming bar which is independent of the mold-board and share, a share which is independent of the plow point bar and mold-board, whereby when the length of the point becomes worn the bar can be adjusted to increase the length of the point and when the share becomes worn it can be removed and a new one substituted. Such construction prevents the discarding of a share having an integral point, if the point becomes worn, or if the share becomes worn, and under such conditions obtaining a considerable saving in expense.

A further object of the invention is to arrange in a manner as hereinafter set forth the plow point bar in such relation with respect to the share, so as to not impede the operation of the plow when plowing.

Further objects of the invention are to provide a plow in the manner as hereinafter set forth which shall be comparatively simple in its construction and arrangement, strong, durable, efficient in its use, and comparatively inexpensive to manufacture.

With the foregoing and other objects in view the invention consists in the novel construction combination and arrangement of parts hereinafter more specifically described and illustrated in the accompanying drawing, wherein is shown the preferred embodiment of the invention, and it is to be understood that changes, variations and modifications can be resorted to which come within the scope of the claims hereunto appended.

In describing the invention in detail reference is had to the accompanying drawings wherein like reference numerals denote corresponding parts throughout the several views, and in which—

Figure 1 is a side elevation of a plow in accordance with this invention, Fig. 2 is a front view thereof, Fig. 3 is a rear elevation, Fig. 4 is a section taken on the line 4—4 of Fig. 3, Fig. 5 is a section taken on the line 5—5 of Fig. 3, and Fig. 6 is a perspective view of the plow point bar, when turned on its outer side, and, Fig. 7 is a detail view illustrating the arrangement of the lower end of the standard with respect to the plow point bar retaining member.

Referring to the drawings in detail, 1 denotes a plow beam, and 2 the plow handle secured at one end of the beam by the hold-fast devices 3.

The plow standard is formed of two members 6 and 7, the member 6 is inturned as at 8 and has its lower portion extend in parallelism with respect to the member 7 as at 9. The member 6 is arranged at one side of the plow beam and the member 7 at the other side of the plow beam. The members 6, 7 which constitute the standard are secured to the plow beam 1 by the hold-fast devices 10 and the said members extend above the top of the plow beam and are connected together by the coupling piece 11 which engages the top of the beam 1 as clearly shown in Fig. 2. The plow standard is braced through the medium of an inclined member 12, which, at its upper end is secured to the lower face of the beam 1 by the hold-fast device 13 and has its lower end extending between the members 6, 7, and connected thereto by the hold-fast device 14. The lower portion of each of the members of the plow standard, that is to say, that part which projects from the hold-fast device 14, is curvilinear in contour and with the lower terminus notched as at 15 to provide shoulders constituting abutments which engage the upper edge of the plow point bar retaining means to be hereinafter referred to.

The mold-board comprises a body portion 16 and a rearwardly-extending flange 17, the latter being at one side of the body portion of the mold-board and constitutes the land-side, the lower portion of the mold-board 16 is cut away as at 18 to provide a seat for the plow share 19, so that the outer face of the share will be flush with the outer face of the mold-board. The share 19 is disposed at an inclination with respect to the transverse line through the center of the mold-board and is of greater width than the width of the seat 18 whereby the share 19 will project from the mold-board as clearly shown in Fig. 3. The inner side edge of the share 19 is disposed at an angle with respect to a longitudinal line through the mold-board, the inclination being greater than the outer edge of the share 19 whereby the inner side of the share is provided with an elongated pointed inner side edge 20 which is adapted to engage in the plow point bar to be hereinafter referred to, so that the inner side of the share which projects from the mold-board will be supported and protected. The share 19 is removably connected to the mold-board by the hold-fast devices 21. By this arrangement if the share becomes worn it can be readily detached from the mold-board and a new share substituted. The plow share 19 is of less width than the width of the mold-board, but of a length as to extend to the plow point bar which is carried at one side of the mold-board.

The plow point bar indicated by the reference character 22, is adjustable and arranged against the lower face of the mold-board and abuts against the inner face of the flange 17. The bar 22 is curved to conform to the curvature of and projects from the lower end of the mold-board and furthermore projects from the lower edge of the plow share. That side of the bar 22 which abuts against the inner face of the flange 17 and which is indicated by the reference character 23 is of greater height than the opposite side 24 of said bar 22 whereby said bar from the side 23 to the side 24 will gradually increase in height. By such construction the bar will stand wear and keep its shape. The bar 22 has its lower face provided with a series of openings 25 adapted to receive a means to prevent the slipping of the bar after the same has been adjusted, such means will be hereinafter referred to. The bar 22 has that side 24 formed with a series of inclined grooves or pockets 26 each of which is adapted to receive the projecting end or point 20 of the share 19 so as to support and protect said projecting end or point 20 and to furthermore prevent grass or roots wedging between the bar and the inner edge of the share which would otherwise impede the operation of or cause a dragging of the plow when plowing. The bar 22 is maintained in its adjusted position through the medium of a combined retaining and coupling member 27 which consists of a plate arranged against the inner face of the mold-board at the lower end thereof and provided with an upwardly-extending pin or lug 28 adapted to engage in an opening 25 when the bar 22 is adjusted whereby said bar is maintained in its adjusted position. The combined retaining and coupling member is secured to the mold-board by the hold-fast devices 21. The combined retaining and coupling member furthermore embodies a rearwardly and upwardly-extending arm 29 terminating in an apertured cap 30 which is adapted to straddle the lower portion of the members 6, 7 so as to couple the lower ends of said members to the lower portion of the mold-board. As before stated the members 6, 7 at their lower ends are provided with shoulders 15 which when the plow standard is in position abut against the upper edge 31 of the plate 27, while the lower terminus of each of said members projects upon the upper face of the plate 27. To fixedly secure the lower ends of the members 6, 7 of the standard to the mold-board a headed bolt 32 extends through the mold-board, between the members 6, 7 and through the apertured cap 30 and carries on its inner end a clamping nut 33 which when screwed home abuts against the cap 30 as clearly shown in Fig. 4. The opening in the mold-board for the reception of the head 34 of the bolt 32 is countersunk. To assist in properly positioning the lower ends of the members 6, 7 when it is desired to couple said members to the mold-board, the latter has projecting rearwardly from its inner face a pair of guide lugs 35, 36 which extend between the members 6, 7. When the plow standard is coupled and secured to the mold-board, the standard 6 engages a portion of the rear face of the plow point bar 22 and maintains the upper portion of said bar 22 against the inner face of the mold-board.

From the foregoing construction and arrangement of parts it is evident that if the length of the plow point should be decreased owing to the use of the plow, and it be desired to increase the length of the said point, the hold-fast devices 21 are loosened which allows of the shifting of the combined retaining and coupling member so that the lug 28 will be clear of the bar 22, the latter can then be shifted downwardly to the desired position or to obtain the necessary length of point, the lug 28 is then positioned into an opening 25 and the combined retaining and coupling member then secured in position by tightening the hold-fast devices 21, and if as before stated the share is worn and it is desired to replace the worn share by a complete share, the hold-fast devices 21 are removed, the share detached from the seat and the complete share positioned and secured to the mold-board by the hold-fast devices 21. If it be desired to disconnect the mold-board plow point and share from the standard, the bolt 32 is loosened, the mold-board with the share and bar 22 is then pulled off the standards.

The mold-board 17 at its center is narrow which will cause the dirt to slide off easier and the wing of the mold-board will turn the surface soil over so that the plow point will break deeper and not turn up the subsoil.

What I claim is:

1. A plow comprising a standard, a mold-board, an adjustable plow point bar positioned against the inner face of the mold-board, a share carried by the mold-board and having one end extending in the plow point bar, and a coupling member carried by the mold-board for detachably-connecting the latter to the standard and for detachably-connecting the bar to the mold-board.

2. A plow comprising a standard, a mold-board, an adjustable plow point bar positioned against the inner face of the mold-board, a share carried by the mold-board and having one end extending in the plow point bar, and a coupling member carried by the mold-board for detachably-connecting the latter to the standard and for detachably-connecting the bar to the mold-board, said standard engaging said bar and abutting against and projecting over said coupling.

3. A plow comprising a standard, a mold-board, an adjustable plow point bar positioned against the inner face of the mold-board, a share carried by the mold-board and having one end extending in the plow point bar, and a coupling member carried by the mold-board for detachably-connecting the latter to the standard and for detachably-connecting the bar to the mold-board, said standard engaging said bar and abutting against and projecting over said coupling, and said mold-board providing guides for said standard.

4. A plow comprising a standard, a mold-board, an adjustable plow point bar arranged against the inner face of the mold-board, a share carried by the mold-board and extending in the plow point bar, and means carried by the mold-board and engaging the standard for detachably-connecting the mold-board thereto, said means further engaging in said bar for detachably-connecting the bar against the mold-board.

5. A plow comprising a standard, a mold-board, an adjustable plow point bar arranged against the inner face of the mold-board, a share carried by the mold-board and extending in the plow point bar, and means carried by the mold-board and engaging the standard for detachably-connecting the mold-board thereto, said means further engaging in said bar for detachably-connecting the bar against the mold-board, said standards engaging a portion of the bar for maintaining it in position.

6. A plow comprising a standard, a mold-board, a coupling means for detachably-connecting the mold board to the standard, a plow point bar arranged against the inner face of the mold-board, a share carried by the mold-board and extending in the side of said bar, and means carried by the said coupling means and engaging in the bottom of the bar for detachably-connecting it to the mold-board.

7. A plow comprising a standard, a mold-board, a coupling means for detachably-connecting the mold-board to the standard, a plow point bar arranged against the inner face of the mold-board, a share carried by the mold-board and extending in the side of said bar, and means carried by the said coupling means and engaging in the bottom of the bar for detachably-connecting it to the mold-board, said standard engaging a portion of said bar for maintaining it in position.

In testimony whereof I affix my signature in the presence of two witnesses.

JOHN H. NICHOLES.

Witnesses:
S. T. BILLUPS,
J. R. RAMSEY.